US010984657B2

(12) United States Patent
Galang et al.

(10) Patent No.: US 10,984,657 B2
(45) Date of Patent: Apr. 20, 2021

(54) SYSTEM AND METHOD FOR VEHICLE-TO-VEHICLE STATISTIC CHALLENGES

(71) Applicant: Toyota Motor Engineering & Manufacturing North America, Inc., Plano, TX (US)

(72) Inventors: Abril A. Galang, Ann Arbor, MI (US); Nathan C. Westover, New Hudson, MI (US); Joshua D. Payne, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 31 days.

(21) Appl. No.: 16/107,238

(22) Filed: Aug. 21, 2018

(65) Prior Publication Data

US 2020/0066149 A1    Feb. 27, 2020

(51) Int. Cl.
*G08G 1/0967* (2006.01)
*H04W 4/46* (2018.01)
*G07C 5/08* (2006.01)

(52) U.S. Cl.
CPC ..... *G08G 1/096791* (2013.01); *G07C 5/0841* (2013.01); *H04W 4/46* (2018.02)

(58) Field of Classification Search
CPC .. G08G 1/096791; H04W 4/46; G07C 5/0841
See application file for complete search history.

(56) References Cited

U.S. PATENT DOCUMENTS

| 6,868,333 | B2 | 3/2005 | Melen |
| 7,363,117 | B2 | 4/2008 | Tengler et al. |
| 9,125,020 | B2 | 9/2015 | Banasky, Jr. et al. |
| 9,147,353 | B1* | 9/2015 | Slusar ................. G08G 1/0129 |
| 9,259,650 | B1 | 2/2016 | Chang |
| 9,536,428 | B1* | 1/2017 | Wasserman ........ H04N 21/4586 |
| 9,858,832 | B1* | 1/2018 | Hsu-Hoffman ........ G09B 19/14 |
| 2005/0107945 | A1 | 5/2005 | Hiller et al. |
| 2011/0281638 | A1* | 11/2011 | Bansi ..................... A63F 13/69 |
| | | | 463/23 |
| 2012/0001744 | A1* | 1/2012 | Giuli ...................... H04L 67/12 |
| | | | 340/439 |
| 2013/0086164 | A1 | 4/2013 | Wheeler et al. |

(Continued)

FOREIGN PATENT DOCUMENTS

WO    WO 2017/085527 A1    5/2017

*Primary Examiner* — Navid Ziaeianmehdizadeh
*Assistant Examiner* — Sean P Quinn
(74) *Attorney, Agent, or Firm* — Haynes and Boone, LLP

(57) ABSTRACT

Methods and systems of the present disclosure allow vehicle participants to issue vehicle statistical challenges to other vehicle participants using V2V communications. Accepted challenges are initiated and vehicle statistics relevant to the challenge are then recorded by the system in both vehicles. Once the challenge is complete, the system calculates and/or compares the results of the challenge, then communicates the results to the challenge participants. The system may also provide options for drivers to communicate via V2V messages, directions, routes, places of interest, or emergency locations in lieu of stopping and inquiring other vehicle participants in person.

18 Claims, 6 Drawing Sheets

(56) References Cited

U.S. PATENT DOCUMENTS

| | | | |
|---|---|---|---|
| 2013/0131918 A1* | 5/2013 | Hahne | H04L 67/12 |
| | | | 701/36 |
| 2013/0231854 A1 | 9/2013 | Rovik et al. | |
| 2017/0097243 A1* | 4/2017 | Ricci | G06F 3/0482 |
| 2018/0218609 A1* | 8/2018 | Sharma | G08G 1/0112 |
| 2018/0225893 A1* | 8/2018 | Brenner | B60R 16/0232 |

* cited by examiner

SYSTEM AND METHOD FOR VEHICLE-TO-VEHICLE STATISTIC CHALLENGES

FIELD OF THE DISCLOSURE

The present disclosure generally relates to vehicle-to-vehicle ("V2V") communication and, more particularly, to a system which allows occupants of one vehicle to issue challenges to occupants of another vehicle using V2V communications.

BACKGROUND

Vehicle owners may have an interest in comparing the performance of their vehicle and, by extension, their performance as drivers, against other vehicle owners. In a conventional system, vehicle owners visit a website wherein the vehicle owner can input data associated with the performance of his or her own vehicle. Some vehicle owners transcribe input data from the vehicle instrument cluster and upload the data to the website as verification of the input data. Other vehicle owners take photographs of the instrument cluster of their vehicles and upload those photographs to the website as verification of the input data. Owners may then access the website and compare their individual vehicle performance to that of the collective group and to other vehicle owners individually.

SUMMARY

In view of the foregoing disadvantages, the present disclosure provides computer-implemented methods for V2V communication. A first V2V challenge application may be initiated to facilitate a V2V challenge between vehicles in proximity to one another, the first V2V challenge application being executed by a first vehicle. A second vehicle proximate the first vehicle that includes a second V2V challenge application is then identified. A V2V challenge is transmitted from the first vehicle to the second vehicle, wherein the V2V challenge is received by the second V2V challenge application on the second vehicle. During the challenge, statistical measure data of the first and the second vehicles is obtained. The statistical measure data is data relevant to the V2V challenge. Results of the V2V challenge are determined based upon the statistical measure data, and those results are communicated to the first and second vehicles.

In other aspects of the disclosure, transmitting the V2V challenge may include causing the first V2V challenge application to present a challenge menu to an occupant in the first vehicle and, in response to a challenge menu selection, transmitting the V2V challenge. The challenge menu may be visually or audibly presented to the occupant. Receiving the V2V challenge may also comprise causing the second V2V application to present the V2V challenge to an occupant in the second vehicle, wherein upon acceptance of the V2V challenge by the occupant, the challenge is initiated.

In other aspects, the statistical measure data may be obtained from at least one sensor onboard the first and the second vehicles. Determining results of the V2V challenge may comprise comparing statistical measure data of the first and the second vehicles.

There are a wide variety of V2V challenges which may be issued to challenge participants. For example, the V2V challenge may challenge the second vehicle to determine which vehicle uses the least amount of fuel between points or which vehicle can coast the longest using regenerative braking without applying actual braking mechanisms. Other challenges may include which vehicle can get to a destination the fastest or which vehicle can get to a destination in the fewest miles. Yet other challengers may include which vehicle can get to a destination the fastest using different routes or which vehicle can accelerate to a defined speed the fastest. The method may also include facilitating electronic messaging or audible communication between the first and the second vehicles. Yet other methods may include generating a record of the statistical measure data of the first and second vehicles.

In another aspect of the present disclosure, a V2V communication system for a vehicle is provided. The system may include a V2V challenge application disposable on a first vehicle and configured to generate a challenge to compete with a second vehicle, wherein the challenge relates to an operational/statistical parameter of the first vehicle. An input/output hardware disposable on the first vehicle may also be provided. The input/output hardware is in communication with the V2V challenge application and configured to communicate the challenge and competition result to a vehicle occupant. One or more sensors are also disposed on the first vehicle. The sensor(s) is configured to obtain statistical measure data of the first vehicle that is relevant to the challenge. Network interface hardware is also configured to transmit the challenge to the second vehicle and receive data from the second vehicle relating to the challenge.

The V2V challenge application may issue many other challenges such as, for example, comparing the data from the first and second vehicles to determine which uses the least amount of fuel between points or which vehicle can coast the longest using regenerative braking without applying actual braking mechanisms. The V2V challenge application may also compare the data from the first and second vehicles to determine which vehicle can get to a destination the fastest or which vehicle can get to a destination in the fewest miles. Additionally, The V2V challenge application may compare the data from the first and second vehicles to determine which vehicle can get to a destination the fastest using different routes or which vehicle can accelerate to a defined speed the fastest. In other aspects, the network interface hardware transmits the challenge directly to the second vehicle and receives data directly from the second vehicle.

The V2V challenge application may determine results of the challenge based upon the statistical measure data and the data received from the second vehicle, then communicate the results of the challenge on the input/output hardware to the operator. The V2V challenge application may also rank the first and the second vehicles when it determines the results of the challenge. The results may then be output to the network interface hardware for transmission to the second vehicle. The V2V challenge application may also display on the input/output hardware a selectable plurality of displayed challenges to be transmitted to the second vehicle, and receive a selection from the input/output hardware selecting one of the selectable plurality of displayed challenges. In addition, the V2V challenge application may communicate with a mobile phone of the vehicle occupant and present the selectable challenges on the mobile phone. Lastly, the V2V challenge application may obtain statistical measure data from the first and the second vehicle in real-time and communicate the results in real-time on the input/output hardware in real-time as the challenge is ongoing.

Another aspect of the present disclosure provides a non-transitory computer-readable medium having stored thereon machine-readable instructions executable to cause a machine to perform any of the methods described herein.

DESCRIPTION OF ILLUSTRATIVE EMBODIMENTS

Figure 1:
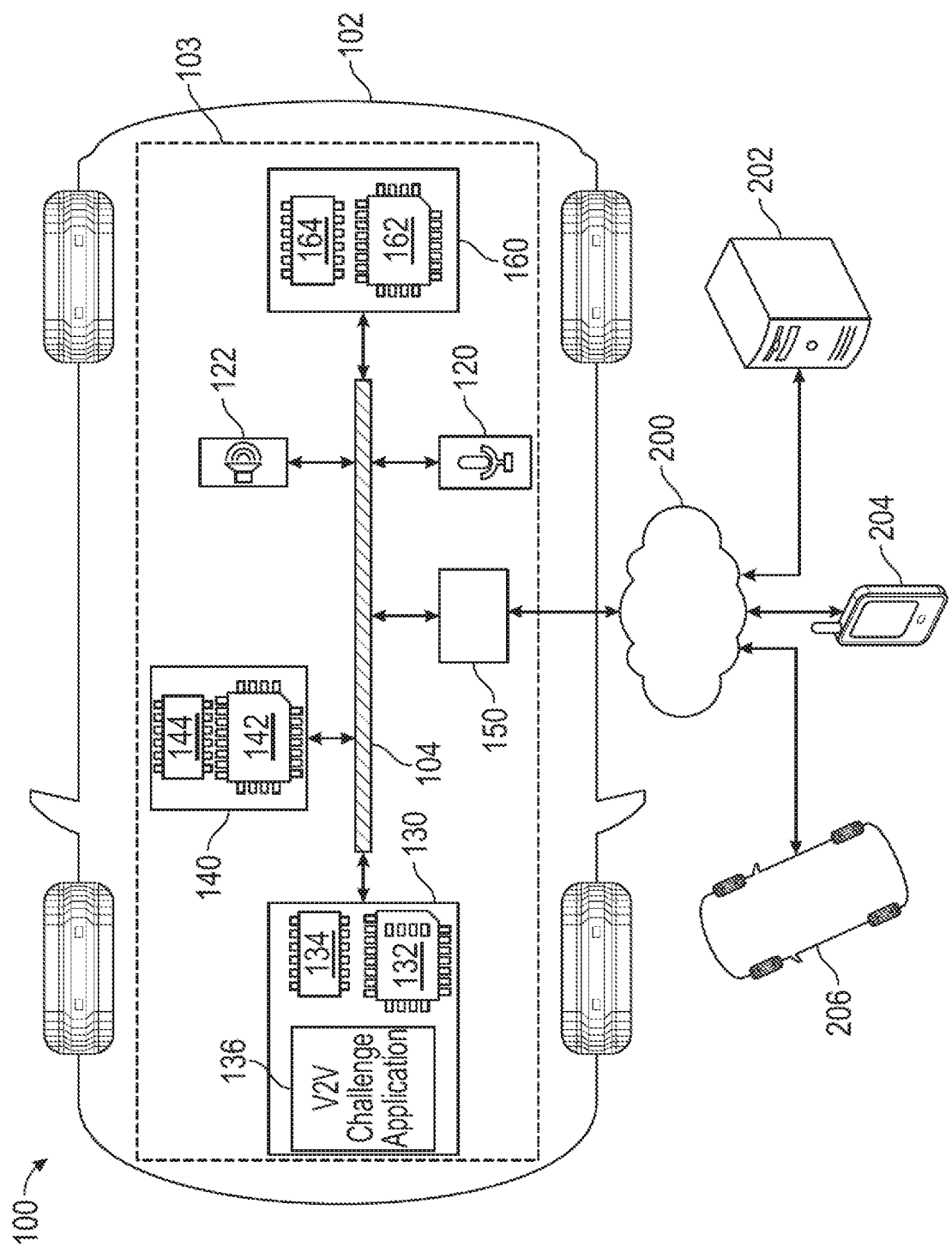
FIG. 1 generally depicts a vehicle having a system for facilitating challenges to proximate vehicles using V2V communications, according to certain illustrative embodiments of the present disclosure.

Illustrative embodiments and related methods of the present disclosure are described below as they might be employed in a system and method for V2V statistical challenges. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, methods and systems of the present disclosure allow vehicle participants to initiate and conduct a wide variety of statistical challenges to other vehicles using V2V communications. A V2V communication is defined as a wireless transmission of data between vehicles directly or over an ad hoc network. When a vehicle occupant desires to issue a challenge to another vehicle in close proximity, the vehicle occupant initiates a V2V challenge application located in his vehicle. The V2V challenge application presents a challenge menu to the occupant wherein he can enter and/or select any variety of challenges. As used herein, a "challenge" refers to an offer issued by vehicle A to vehicle B to compete based upon some measurable vehicle data point (also referred to herein as vehicle "statistical measure data"). Statistical measure data is data relevant to the V2V challenge. Once the selected challenge is complete, based upon the statistical measure data, the system determines the results of the V2V challenge.

A wide variety of vehicle statistical challenges may be issued to challenge participants. For example, the challenge may be: "would you like to see which vehicle could use the least amount of fuel between point A or B?" Once selected, the system then transmits the challenge, using V2V communications, to a second vehicle capable and authorized to participate in such challenges. A second V2V challenge application located in the second vehicle receives the challenge and presents it to a vehicle occupant in the second vehicle. If the second occupant accepts, the challenge is initiated and vehicle statistics relevant to the challenge are then recorded by the system in both vehicles. Relevant statistics may be, for example, miles-per-gallon ("MPG") or acceleration data obtained using sensors onboard the vehicles. Once the challenge is complete, the system calculates and compares the results of the challenge, then communicates the results to the first and second vehicle occupants.

In a generalized method of the present disclosure, a first V2V challenge application initiates a challenge between vehicles in proximity to one another. Authorized vehicles proximate the first vehicle are identified, and the V2V challenge application transmits a V2V challenge from the first vehicle to an authorized second vehicle. The V2V challenge is received by a second V2V challenge application on the second vehicle, where the challenge is then presented to an occupant of that vehicle. If the second occupant accepts, the challenge is initiated and the system begins acquiring statistical measure data of the first and second vehicles during the challenge. Thereafter, the results are communicated to the first and second vehicles.

FIG. 1 generally depicts a vehicle having a system for facilitating challenges to adjacent vehicles using V2V communications and an associated network over which the challenge may be communicated, according to certain illustrative embodiments of the present disclosure. As will be discussed in more detail below, the vehicle includes an onboard electronic control unit which includes an executable V2V challenge application using the statistical measure data received from sensors in the vehicle. The vehicle transmits and receives vehicle statistical measure data directly and indirectly to and from other vehicles participating in the challenge. A direct example may include the vehicle communicating with another vehicle in close proximity Indirect examples may include the vehicle communicating with a networked server, including a "cloud" based server. Once the statistical measure for all vehicles in the challenge is received by the vehicle, the system performs calculations and comparisons of the statistical data in order to determine the outcome of the V2V challenge. Vehicles incorporating such systems and the networks that communicate with such vehicles will be described in more detail below.

FIG. 1 schematically depicts an embodiment of a system 100 comprising a vehicle 102 and a communication system enabling the vehicle 102 to communicate either directly or indirectly with other vehicles. It is noted that, while vehicle 102 is depicted as an automobile, vehicle 102 may be any passenger or non-passenger vehicle such as, for example, a terrestrial, aquatic, and/or airborne vehicle. The vehicle 102 includes a driver statistic system 103 that may monitor and detect certain operational parameters of the vehicle 102 during operation. The driver statistic system 103 may include, for example, an electronic control unit 130, an inter-cluster display 140, a network interface hardware 150, and an in-vehicle display 160, among other components.

Vehicle 102 may comprise a communication path 104 that provides data interconnectivity between various vehicle components, including the electronic control unit 130, the inter-cluster display 140, the network interface hardware 150, and the vehicle display 160. Accordingly, communication path 104 communicatively couples any number of vehicle components with one another, and allows the vehicle modules to operate in a distributed computing environment. Specifically, each of the vehicle components can operate as a node that may send and/or receive data. In one embodiment, communication path 104 comprises a conductive material that permits the transmission of electrical data signals to processors, memories, sensors, and actuators throughout vehicle 102. In another embodiment, communication path 104 can be a vehicle bus, such as for example a LIN bus, a CAN bus, a VAN bus, and the like. In further embodiments, communication path 104 may be wireless or, alternatively, an optical waveguide. As used herein, the term "communicably or communicatively coupled" means the components are capable of exchanging data signals with one another such as, for example, electrical signals via conductive medium, electromagnetic signals via air, optical signals via optical waveguides, and the like.

In this example, vehicle 102 generally comprises input/output hardware communicably coupled with communication path 104. The input/output hardware serves as an interconnection between a driver/occupant and vehicle 102. The input/output hardware can be any device capable of transforming mechanical, optical, or electrical signals into a data signal capable of being transmitted with communication path 104. Moreover, the input/output hardware can be any device capable of transforming a data signal into a mechanical, optical, or electrical output. Each individual component of the input/output hardware can optionally include one or more processors and one or more memories. Alternatively, each individual component of the input/output hardware can optionally omit a processor and/or a memory. Accordingly, it is noted that, while specific components are described herein as including a processor and/or a memory, the embodiments described herein should not be so limited. The input/output hardware may be any input device capable of receiving an input, including a keyboard, dial, button, microphone, mouse, touchpad or touchscreen, trackball, joystick, toggle, or other device.

The input/output hardware may include a microphone 120 for receiving input from a user. Microphone 120 can be any sensor that transforms mechanical vibrations into a data signal. The input/output hardware may also include a speaker 122 for transforming data signals into mechanical vibrations. Still referring to FIG. 1, the input/output hardware may include one or more displays for visually presenting data. Depending on the implementation, the one or more displays may be disposed at any location in the passenger compartment of vehicle 102 and may present visual information to an occupant of the vehicle. The one or more display may include any medium capable of transmitting an optical output such as, for example, a cathode ray tube, light emitting diodes, liquid crystal displays, plasma displays, or the like. Each of the one or more displays can be a touchscreen that, in addition to providing optical information, detects the presence and location of a tactile input upon a surface of or adjacent to the display. Accordingly, each display can receive mechanical input directly upon the optical output provided by the display. In some embodiments, the inter-cluster display 140 and the in vehicle display 160 form a part of the input/output hardware carried on the vehicle 102

The term "sensor," as used herein, means a device that measures a physical quantity and converts it into a data signal, which is correlated to the measured value of the physical quantity, such as, for example, an electrical signal, an electromagnetic signal, an optical signal, a mechanical signal, or the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. Additional sensors may also be envisioned, as will be discussed below.

The electronic control unit 130 may be communicatively coupled with the communication path 104. The electronic control unit 130 can comprise a control unit processor 132 communicatively coupled to a control unit memory 134. In certain illustrative embodiments of the present disclosure, a V2V challenge application 136 described herein is stored in memory 134 and executed by processor 132.

The instrument cluster display 140 also may be communicatively coupled with the communication path 104. The instrument cluster display 140 can comprise a cluster processor 142 communicatively coupled with a cluster memory 144.

The in-vehicle display 160 may be communicatively coupled with communication path 104. In-vehicle display 160 may include a display processor 162 communicatively coupled with display memory 164. In some implementations, the in vehicle display 160 may be redundant with the instrument cluster display 140, and may be integrated therein.

Additionally, it is noted that, while each of electronic control unit 130, instrument cluster display 140, and in-vehicle display 160 are depicted in FIG. 1 as including an integral processor and memory, each may be implemented without a processor and/or a memory. For example, any of the processors described herein may be separately located within any component communicatively coupled with communication path 104. Accordingly, vehicle 102 may include a plurality of components each having one or more processors that are communicatively coupled with one or more of the other components. Thus, the illustrative embodiments described herein may utilize a distributed computing arrangement to perform any portion of the logic described herein.

According to the illustrative embodiments described herein, the processors described herein may include any device capable of executing machine readable instructions. Accordingly, each processor may be a controller, an integrated circuit, a microchip, a computer, or any other computing device. The memory described herein may be RAM, ROM, a flash memory, a hard drive, or any device capable of storing machine readable instructions. The logic that includes machine readable instructions or an algorithm written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into computer-readable instructions and stored on a non-transitory computer-readable medium. Alternatively, the logic or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, or as a combination of hardware and software components.

In one embodiment, vehicle 102 comprises network interface hardware 150 for communicatively coupling vehicle 102 with network 200. Network interface hardware 150 can be communicatively coupled to communication path 104 and can be any device capable of transmitting and/or receiving data via network 200. Accordingly, network interface hardware 150 can include an antenna and/or other communication transceiver for sending and/or receiving any wired or wireless communication. For example, network interface hardware 150 may include an antenna, a modem, LAN port, wireless fidelity (Wi-Fi) card, WiMax card, mobile communications hardware, near-field communication hardware, satellite communication hardware and/or any wired or wireless hardware for communicating with other networks and/or devices. Depending upon the implementation, the network interface hardware 150 may form a part of the electronic control unit 130 or other unit of the vehicle 102.

The network 200 may be utilized to communicatively couple vehicle 102, one or more remote computing devices 202, one or more mobile devices 204, or a second vehicle computing device 206. In addition, each of vehicle 102, one or more remote computing devices 202, one or more mobile devices 204, and second vehicle 206 can be communicatively coupled to one another directly or indirectly via the network 200. For example, one or more devices communicatively coupled to network 200 can operate as an intermediary to transmit data between any of the other devices. Accordingly, network 200 can facilitate a distributed computing arrangement amongst vehicle 102, one or more remote computing devices 202, one or more mobile devices 204, and vehicle 206. Specifically, any of the devices communicatively coupled to network 200 can share cloud resources such that each communicatively coupled device can perform any portion of the logic described herein.

The computing devices 202 can comprise one or more processors and one or more memories. The one or more processors can execute logic to provide resources to vehicle 102 and/or any other device communicatively coupled to network 200. For example, the one or more remote computing devices 202 can provide supplementary processing power, via relatively high powered processors, to vehicle 102. In some implementations, the one or more remote computing devices 202 may provide supplementary data storage to vehicle 102. Moreover, one or more remote computing devices 202 can provide platforms such as, for example, a social networking service, news service, weather service, traffic service, map service (e.g., restaurant data, fuel station data, service station data), and any other service capable of being exchanged between a server and a client.

The one or more mobile devices 204 may be communicatively coupled to vehicle 102 via the network 200. In certain embodiments of the present disclosure, mobile device 204 may be a mobile phone of a third party or an occupant of vehicle 102 or 206 used to interface with the V2V challenge application being executed by electronic control unit 130. Each of the one or more mobile devices 204 can comprise one or more processors and one or more memories. Accordingly, one or more mobile devices 204 can operate as a client and/or a server with respect to the vehicle 102. The one or more mobile devices 204 may be configured as a cellular or mobile telephone, with functionality for wireless data communications. Thus, while the mobile device 204 is depicted herein as a mobile telephone, it should be understood that mobile device 204 can be any mobile communications device that can exchange data via a mobile telecommunication service such as, for example, a personal digital assistant, a smart phone, or a laptop computer with a wireless communication peripheral. Furthermore, it is noted that one or more mobile devices 204 may further be configured to communicate data via one or more cellular networks, satellite networks and/or computer networks. In one embodiment, network interface hardware 150 of vehicle 102 can be communicatively coupled to mobile devices 204 via a personal area network such that mobile devices 204 communicatively couples the network interface hardware 150 to the network 200.

The one or more additional vehicles 206 communicatively coupled to vehicle 102 via a V2V communications link of network 200. Vehicle(s) 206 are also equipped with components similar to the vehicle 102, thus enabling vehicle 206 to receive, issue, and process challenges.

Depending upon the implementation, the network 200 may include one or more, V2V networks, cellular networks, satellite networks and/or computer networks such as, for example, a wide area network, a local area network, personal area network, a global positioning system and combinations thereof. Suitable local area networks may include wired Ethernet and/or wireless technologies such as, for example, Wi-Fi or near-field communication protocols. Suitable personal area networks may include wireless technologies such as, for example, IrDA, Bluetooth, Wireless USB, Z-Wave, ZigBee, and the like. Alternatively or additionally, suitable personal area networks may include wired computer buses such as, for example, USB and FireWire. Suitable cellular networks include, but are not limited to, technologies such as LTE, WiMAX, UMTS, CDMA, and GSM. Thus, any components of the vehicle 102 can utilize the network 200 to transmit signals over the Internet.

The V2V challenge application 136 may be stored in and executed by electronic control unit 130. In certain implementations, a vehicle occupant desiring to challenge other vehicle occupants may register with the server by accessing a web portal associated with the V2V challenge application 136 of electronic control unit 130. For example, an owner/driver/occupant of vehicle 102 desiring to initiate or accept challenges may access a web portal by using instrument clusters display 140, mobile device 204, or remote computing device 202. The user may create a user account that provides access to data on the web portal that is accessed from network 200. The user may enter a user name and provide a password to authenticate the user on the web portal. The user may also provide a variety of personal identifying information and/or vehicle identifying information including, but not limited to, the user's name, home location, vehicle make, vehicle model, vehicle model year, vehicle configuration, vehicle identification number, and or other information.

In some implementations, the web portal may accesses a database, such as may form a part of remote computing device 202, that is available through network 200 that includes a variety of vehicle data that can be associated with a user account based on the entered vehicle identification number. Additionally, the user may designate the user account information associated with the network interface hardware 150 of vehicle 102, thereby allowing the vehicle 102 to communicate with the web portal through network 200 so as to enable transmission of and receipt of data associated with the user account and/or the statistical measure data associated with the challenge.

As multiple users create user accounts on the web portal (using other vehicles, for example), the user accounts may be segregated into a plurality of pre-determined user groups.

The pre-determined user groups may be defined based on vehicle and/or location-based parameters of the users including vehicle type such as vehicles grouped according to, for example, EPA vehicle class, vehicle make, vehicle model, vehicle configuration such as vehicles having similar drivetrains, engine displacement, transmissions, user home location, or other parameters. Each of vehicles 102 or 206 within the pre-determined user group may include the elements of vehicle 102 described above in regard to FIG. 1 that allow for the vehicles to communicate with network 200. The vehicles 102 may transmit and/or receive data with network 200. After the users have registered via the web portal, they and their associated vehicles are now registered to participate in challenges, and the V2V challenge application 136 may be active on their vehicles.

Figure 2:
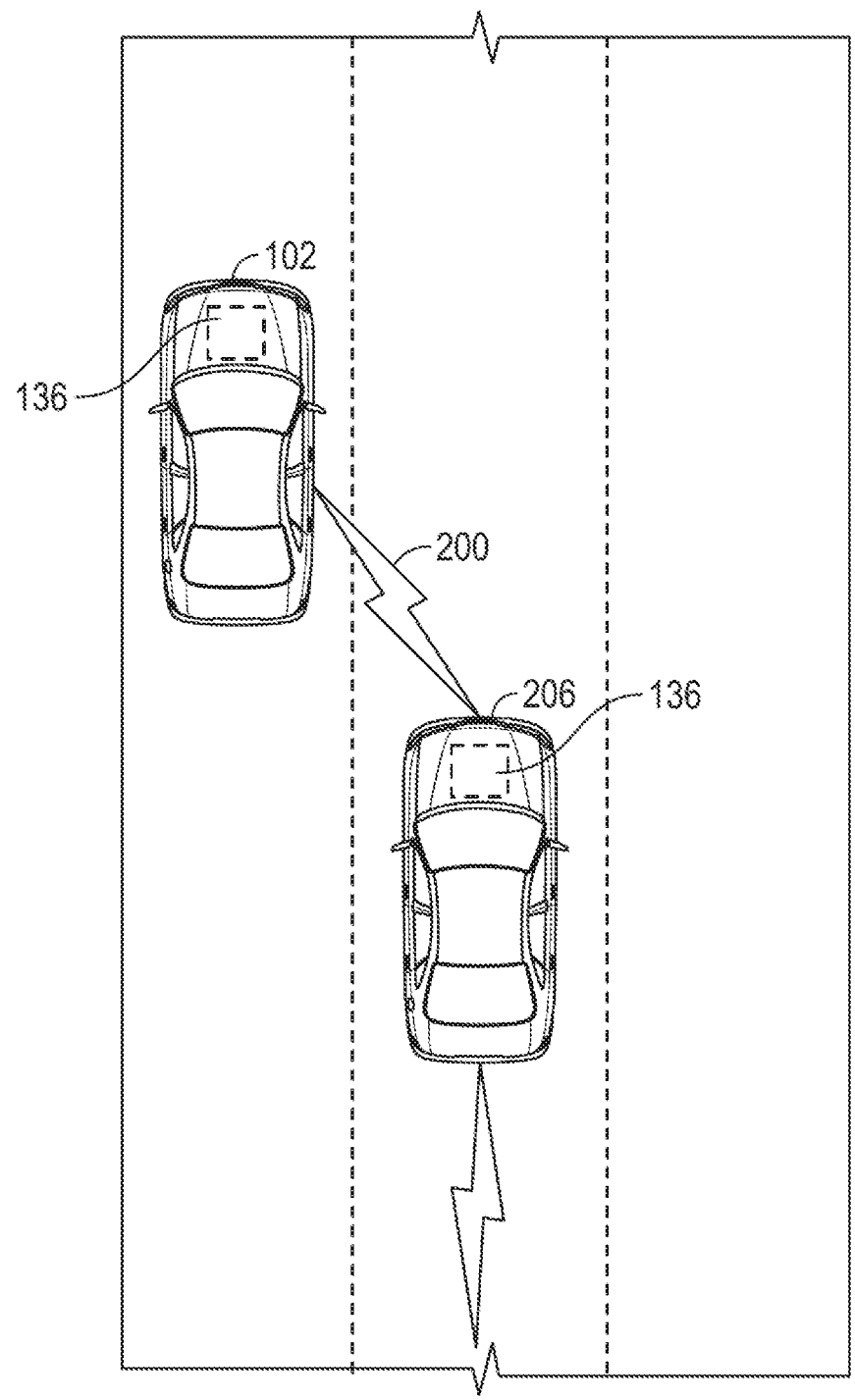
FIG. 2 illustrates a first vehicle and a proximate second vehicle traveling along a highway, each registered to accept and/or issue V2V challenges according to certain illustrative embodiments of the present disclosure.

FIG. 2 illustrates a first vehicle 102 and a proximate second vehicle 206 traveling along a highway, each including the V2V challenge application 136, and each registered to accept and/or issue V2V challenges. With reference to both FIGS. 1 and 2, when, for example, an occupant of vehicle 102 desires to challenge a vehicle in its proximity, the occupant may initiate the V2V challenge application 136 via instrument cluster display 140 or some other computing means associated with the V2V challenge application (e.g., a mobile phone 204). The instrument cluster display 140 or other computing means may include a graphical user interface allowing the occupant to interact with and enter data into the V2V challenge application, all operations of which are controlled by electronic control unit 130. For example, when the V2V challenge application 136 is initiated, the system may automatically scan the proximate area (for example, within a 0.25 mile range) to identify other vehicles registered to participate in V2V challenges. Any suitable "handshaking" protocol may be utilized here, as will be readily understood by those ordinarily skilled in the art having the benefit of this disclosure. Once the authorized/participating vehicles are identified, each may be displayed on the graphical user interface of the cluster display 140, or on some other device, such as the user's mobile phone, thereby allowing the occupant of vehicle 102 to select those vehicles he desires to challenge.

Figure 3A:
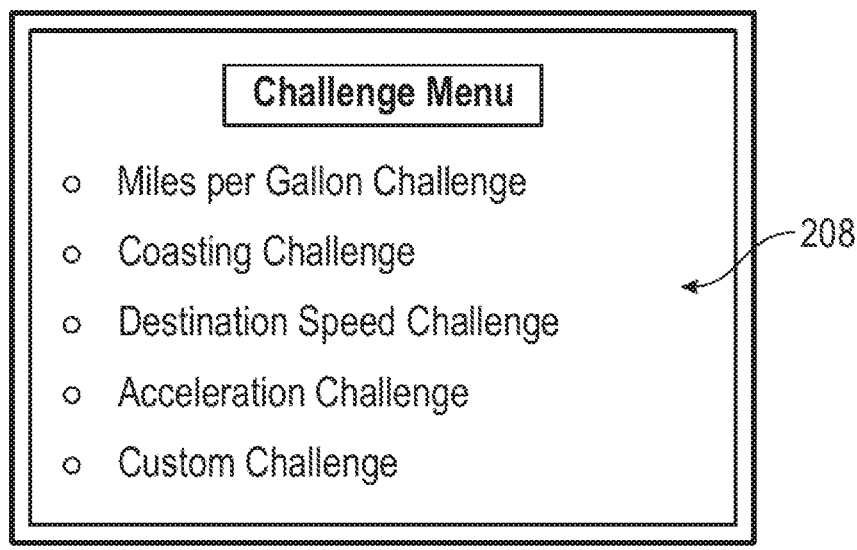
FIG. 3A is a web portal accessible via a cluster display, according to certain illustrative embodiments of the present disclosure.

FIG. 3A shows an example web portal 208 accessible using cluster display 140 (or any other suitable computing means as described herein), according to illustrative embodiments of the present disclosure. Here, web portal 208 has been accessed by an occupant of vehicle 102, whereby a challenge menu is display allowing the user to select a challenge relating to an operational parameter of the vehicle, such as a MPG challenge, coasting challenge (to determine which vehicle can coast the longest), a destination speed challenge (which vehicle can arrive at destination B the fastest), acceleration challenge, a custom challenge (where the user can enter a custom challenge), or any other variety of challenges relating to vehicle statistics. The user may then select the challenge accordingly. Selecting the challenge may include touching the display screen, use a scroll wheel and button selector, or other selection device, using a toggle switch and button selector, making a voice activated choice using the microphone 122, or other input/output hardware.

Additionally, instrument cluster display 140 may allow a user to select other specific challenges he wishes to issue. For example, the challenge menu may include challenges such as: (1) would you like to see who could use the least amount of fuel between points A and B?; (2) would you like to see who can coast the longest using regenerative braking without applying the actual brakes?; (3) would you like to see who can get to destination B the quickest?; (4) would you like to see who can get to destination B in the fewest miles?; (5) would you like to see who can get to destination B the quickest using different routes? (i.e., route time or efficiency); or (6) would you like to see who can get to 50 MPH the quickest? In other illustrative methods, any variety of challenges may be issued.

Once the challenge is selected by the user in vehicle 102, the V2V challenge application 136 then initiates the challenge which is transmitted wirelessly via communications module 150 over network 200 or directly to second vehicle 206. In certain embodiments, the challenge may be broadcast to all proximate registered vehicles. Alternatively, the challenge may only be transmitted to selected vehicles.

Second vehicle 206 is also equipped with components similar to the vehicle 102, thus enabling second vehicle 206 to receive and/or issue challenges. Thus, the V2V challenge application 136 on board vehicle 206 (or a mobile device of an occupant of vehicle 206) displays the challenge transmitted by first vehicle 102, such that the occupant of second vehicle 206 may accept or refuse the challenge using an input selector, such as input/output hardware described herein.

If vehicle 206 accepts the challenge, the challenge is initiated and the acceptance is communicated over network 200 or directly between the vehicles such that both vehicle occupants are aware. Once the challenge is initiated, the V2V challenge application 136 on the electronic control units 130 of each vehicle 102, 206 then obtain statistical measure data associated with the challenge. The statistical measure data may be any data point related to the challenge such as, for example, the MPG, fuel consumption, speed, braking behavior, acceleration, geo positioning of the vehicle, or other measurable or detectable information. As discussed in more detail below, the statistical measure data may be obtained using various sensors onboard the vehicles.

Once the challenge is completed, the statistical measure data is exchanged between the vehicles, whereby each V2V challenge application 136 analyzes and compares the statistical measure data to determine the challenge winner. Once this is determined, the results are communicated to the occupants of both vehicles. In certain embodiments, the statistical measure data and/or challenge results may be recorded on the network, such as on the remote computing devices 202 or other memory for later retrieval during subsequent challenges.

Figure 3B:
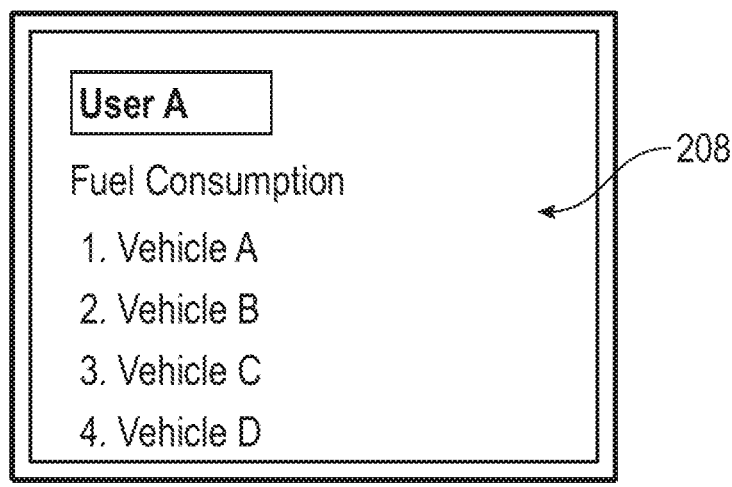
FIG. 3B is another web portal displaying the challenge results, according to certain illustrative embodiments of the present disclosure.

FIG. 3B shows an example of another web portal 208 displaying the challenge results, according to certain illustrative methods of the present disclosure. Here, the statistical measurement data obtained from sensors onboard the vehicles may be communicated/exchanged over network 200, thus allowing system 100 to compute the challenge results and rankings based on the data. In the example of FIG. 3, the challenge was which vehicle attained the best fuel consumption between points A and B. Here, vehicle A was the winner, with vehicles B, C, and D trailing in ranking order. Thus, in certain illustrative methods, system 100 may compute a plurality of driver performance rankings within a pre-determined group of authorized proximate vehicles based on a variety of data included in vehicle statistical measurement data, as will be discussed in further detail below. Some implementations also show the sensed results of the challenge, such as the fuel used, the speed, acceleration, distance, or other relevant parameters. Users having user accounts can log in to web portal 208 and inspect the driver performance ranking as computed by system 100. In other examples, users can also select which challenge criteria is of interest and display the driver performance ranking that is associated with that challenge criteria. In yet other illustrative embodiments, the challenge menu, request/acceptance, and results may be audibly communicated to the users in other vehicles equipped with voice activation and recognition software, such as through the input/output hardware described herein.

Figure 4:
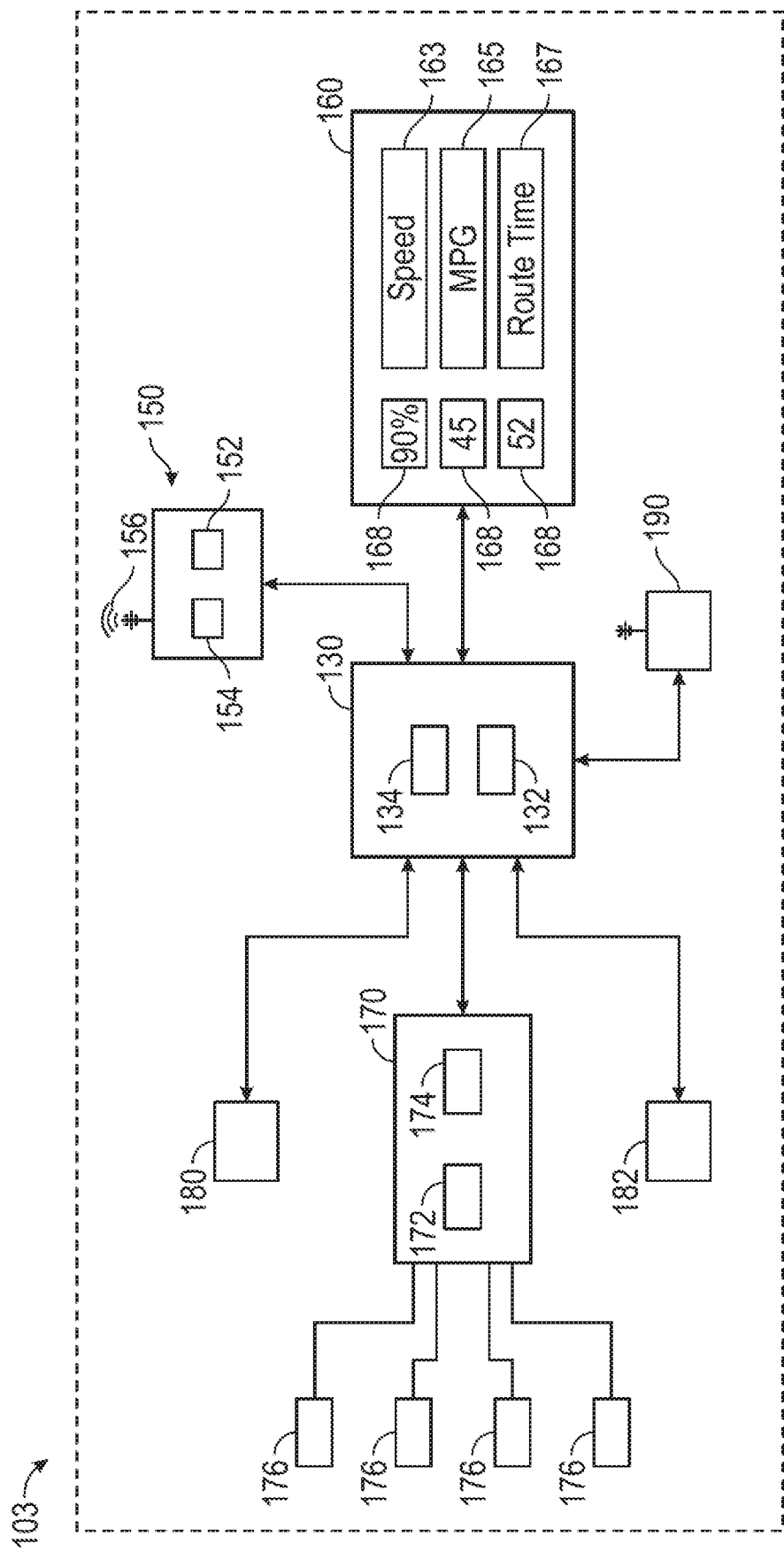
FIG. 4 is a schematic depiction of a driver statistic system for a vehicle according to certain embodiments of the present disclosure.

FIG. 4 shows a schematic depiction of the driver statistic system 103 for the vehicle 102 or 206. In the example shown, driver statistic system 103 includes the in-vehicle display 160 communicatively coupled to electronic control unit 130. As described above, these may be coupled via the path 104 (FIG. 1). The in-vehicle display 160 may be configured to display a plurality of vehicle statistical measure data 168 obtained by driver statistic system 103, and an associated vehicle statistic label 163, 165, 167. In certain illustrative embodiments, vehicle statistical measure data 168 may be related to fuel consumption of vehicle 102, speed of the vehicle 102, geo-position of vehicle 102, fuel level in the fuel tank of vehicle 102, battery charge level of vehicle 102, travel time of vehicle 102, acceleration, or the like. In some embodiments, electronic control unit 130 is reconfigurable to allow a driver or passenger of the vehicle to change the vehicle statistical measure data 168 and the associated vehicle statistic label 163, 165, 167 to display the desired type of data. In addition, in-vehicle display 160 may allow a driver of vehicle 102 to visually inspect the status of various components of the vehicle 102 equipped with sensors for evaluating vehicle status.

Driver statistic system 103 depicted in FIG. 4 further includes a plurality of sensors that measure the performance variables (i.e., statistical measure data) of vehicle 102 or 206. In one embodiment, the vehicle 102 includes at least one wheel speed sensor 180 that is communicatively coupled to electronic control unit 130. Wheel speed sensor 180 transmits a vehicle sensor signal to electronic control unit 130 that corresponds to the rate of rotation of a wheel. Based on the vehicle sensor signal sent from the wheel speed sensor 180, electronic control unit 130 calculates vehicle speed.

Vehicles 102 or 206 may further include a fuel fill sensor 182 for gasoline or diesel-fueled vehicles. Fuel fill sensor 182 transmits a vehicle sensor signal to electronic control unit 130 that corresponds to the fill level of fuel in the fuel tank. Alternatively or in addition, for electric or hybrid-electric vehicles, the vehicles may include a battery status sensor. The battery status sensor transmits a vehicle sensor signal that corresponds to the charge level of the batteries. An instruction set stored in the control unit memory 134 of electronic control unit 130 may be executed to calculate vehicle range based on the remaining fuel (e.g., MPG) and/or electricity on-board the vehicle 102.

In some embodiments, driver statistic system 103 of the vehicles may also include a satellite navigation system receiver 190 that is communicatively coupled to electronic control unit 130 through communication path 104. The satellite navigation system receiver 190, for example a Global Positioning Satellite (GPS) receiver, may receive a signal from a plurality of satellites to determine the location of the vehicles (e.g., in challenges involving statistical measure data related to points of destination or to locate proximate vehicles). The satellite navigation system receiver 190 may transmit a vehicle sensor signal that contains a position signal indicating the position of the vehicles 102 in relation to one another, in relation to some destination point, etc.

For vehicles 102 including combustion engines, vehicle 102 may include an engine control unit 170. The engine control unit 170 may include an engine control unit memory 174 for storing a computer readable and executable instruction set and an engine control unit processor 172. The engine control unit processor 172 may adjust engine operating parameters to provide the required power delivery of the engine based on the instruction set stored in the engine control unit 170. In such embodiments, the engine control unit 170 maybe communicatively coupled to at least one fuel injector 176. The fuel injectors 176 meter fuel into the combustion chambers for power generation by the engine. The engine control unit 170 may transmit a vehicle sensor signal to electronic control unit 130 that corresponds to the amount of fuel metered by fuel injectors 176 to the engine. The instruction set stored in control unit memory 134 of electronic control unit 130 may calculate fuel consumption of vehicle 102. The engine control unit 170 may also transmit any of the other data stored locally in the engine control unit memory 174 of engine control unit 170 that relates to engine performance.

As noted above, vehicle 102 may also include network interface hardware 150 that is communicatively coupled to the electronic control unit 130. The network interface hardware 150 may include a receiver 152 and a transmitter 154 that are coupled to an antenna. The instruction set stored in control unit memory 134 of electronic control unit 130 is configured to transmit a vehicle status signal to the network interface hardware 150. The vehicle status signal may include a variety of vehicle performance, status, and/or statistical measurement data including data that was transmitted by the various vehicle sensors as vehicle sensor signals and received by electronic control unit 130. The network interface hardware 150 is configured to transmit vehicle statistical measure data signal 156 wirelessly to network 200 (see FIG. 1).

As mentioned above, each vehicle 102, 206 may include substantially similar hardware and software as other vehicles authorized to participate in V2V challenges. Commonality of components of the vehicles permits comparison of the vehicle statistical measures data and/or historic driver performance.

While specific mention has been made hereinabove to possible configurations of vehicles 102 and 206, it should be understood that the listing of vehicle components and sensors is non-exhaustive. In addition, vehicles may include a plurality of sensors used to obtain other statistical measure data such as vehicle performance or status including sensors that measure braking loads, steering loads, steering inputs, lateral vehicle loading, payload loads, towing loads, engine operation status, window open status, seat belt status, seat belt usage rate of occupants, turn signal use, and the like. These various quantities may be included in the vehicle status signal.

With reference back to FIG. 1, system 100 is configured to process the vehicle statistical measure data signals 156 and to determine the outcome of challenges by, for example, a ranking of vehicles in an authorized group of vehicles based on the signals 156 sent from a plurality of vehicles 102. In some examples, network 200 evaluates the statistical measure data of each vehicle, compares the statistical measure data, then calculates a listing of drivers, vehicle owners, and/or vehicles 102 from those having the highest vehicle performance to those having the lowest vehicle performance. The vehicles 102 can be ranked according to any of the statistical measures data contained in signal 156 such as, for example, vehicle fuel consumption including fuel economy, average speed of vehicle 102, average acceleration rate of vehicle 102, average deceleration rate of vehicle 102, carbon dioxide production, average braking loads of the vehicle 102, average steering loads, average steering inputs, average lateral vehicle loads, average payload loads, average towing loads, engine operating status, window open status, seat belt usage rate of occupants, turn signal usage rates, and the like.

The challenge results may be communicated to the participants in a variety of ways. As mentioned above, the challenge initiation and results may be communicated using visual or audible methods. With respect to the former, for example, the driver performance ranking determined by system 100 may be accessible to users by logging in to web portal 208 (FIGS. 3A and 3B). As discussed above, web portal 208 is accessible by a variety of computing devices that are connected to network 200, for example remote computing devices 202, mobile devices 204, or computing devices of vehicle 206. A user of remote computing device 202, for example, may select a vehicle performance parameter/statistical measure of interest to display the driver performance ranking of other users whose user accounts have been registered to participate in challenges. Because vehicle statistical measure signals 156 can be sent autonomously and continuously, the ranking of the users listed on web portal 208 can be viewed in real-time in some implementations. Alternatively, the results may be displayed on a suitable display inside participating vehicles or the mobile devices of participants.

Figure 5:
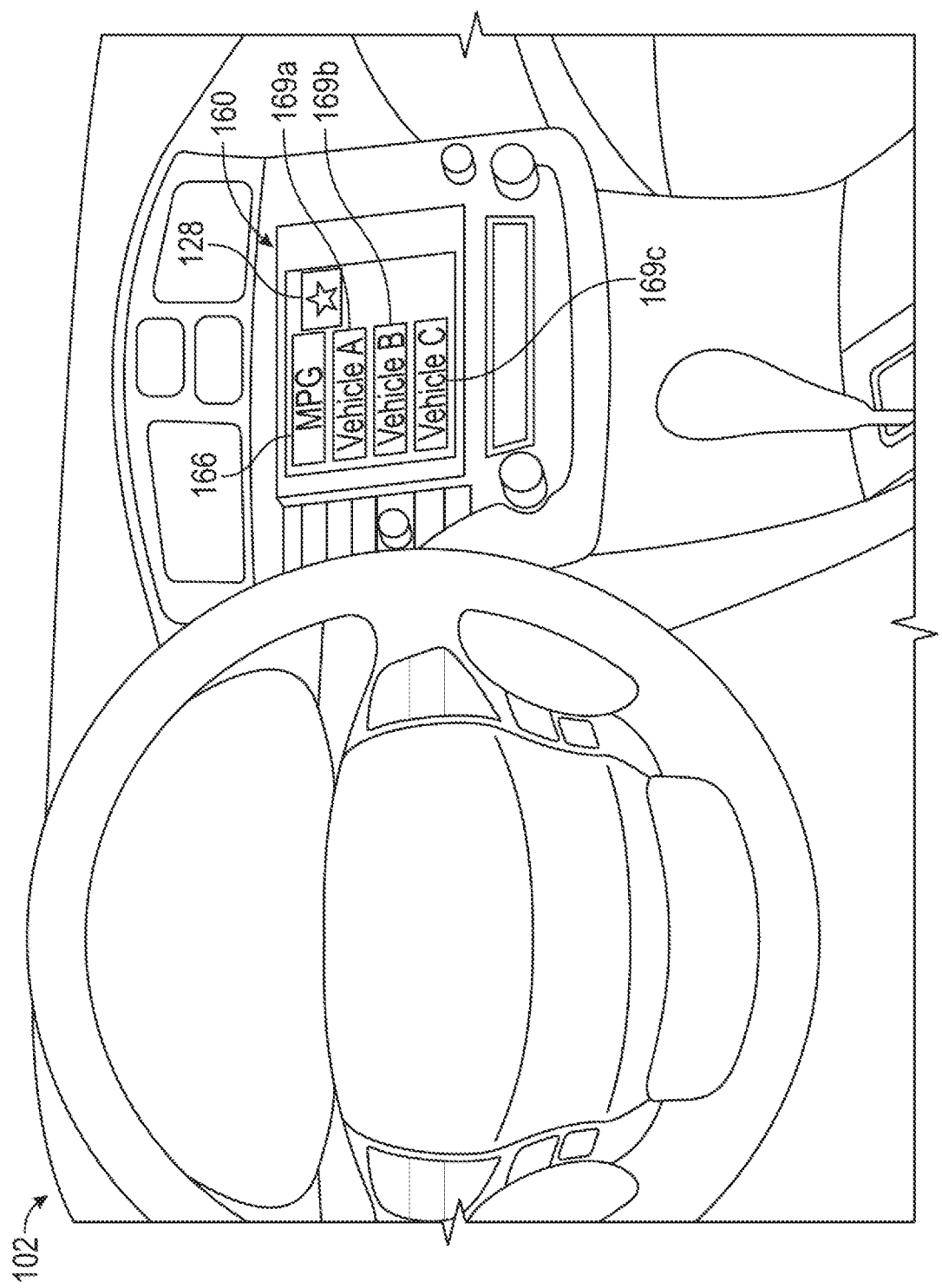
FIG. 5 illustrates an interior compartment of a vehicle, according to certain illustrative embodiments of the present disclosure.

FIG. 5 illustrates an interior compartment of a vehicle 102, according to certain illustrative embodiments of the present disclosure. This example shows the in-vehicle display 160 configured to display at least a portion of the challenge ranking computed using the statistical measure data signals 156 received from the participating vehicles. Similar to web portal 208 accessed from a remote computing device discussed hereinabove, a user of the in-vehicle display 160 may select the vehicle statistical measure data 166 of interest for which to display the ranking of user identifiers 169a, 169b, 169c. Additionally, in-vehicle display 160 may include a sync indicator 128 that appears on in-vehicle display 160 when network interface hardware 150 is transmitting and/or receiving signals with network 200. The ranking of the users listed on in-vehicle display 160 can be view in a real-time comparison on the in-vehicle display 160 or merely as tallied results, depending upon the implementation and desire of the operator.

In yet other illustrative embodiments, system 100 also allows users participating in the challenge to communicate with one another. For example, users may audibly communicate with one other using microphone 120 in vehicles 102 and 206 during a challenge. Alternative, via one of the networked computing devices described herein, users may message one another during a challenge. Also, participants may communicate using their mobile devices.

A variety of other communications may be performed over system 100, including those seeking help from other participants (e.g., in the event of a crash). In addition, the system may store data related to the rate a user responds to such assistance requests. In yet other examples, the systems described herein may also provide options for drivers to communicate via V2V messaging including, for example, requesting from other participants information related to directions, routes, places of interest, and emergency locations (e.g., hospitals, police stations, etc.) in lieu of stopping and asking the vehicle participants in person.

Figure 6:
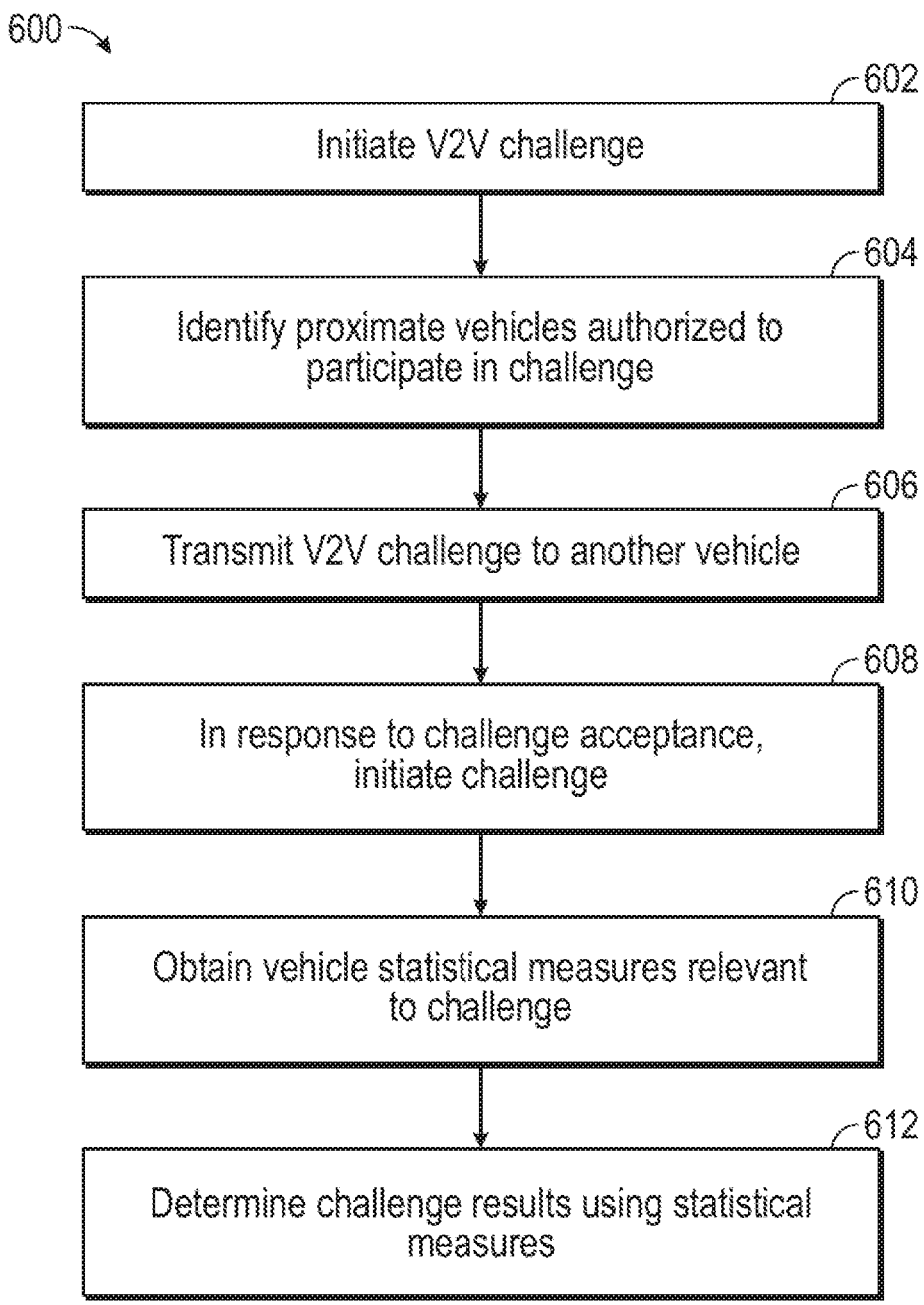
FIG. 6 is a flow chart of a method for V2V communications, according to certain illustrative methods of the present disclosure.

In view of the foregoing, FIG. 6 is a flow chart of a method 600 for initiating and carrying out a V2V challenge, according to certain illustrative embodiments of the present disclosure. Method 600 may be performed by one or more of the various computing devices of system 100, as described herein. At block 602, system 100 initiates a first V2V challenge application to facilitate a challenge between vehicles in proximity to one another, the first V2V challenge application being located in a first vehicle. For example, a user in vehicle 102 accesses the challenge menu and initiates a challenge to be broadcast to proximate participating vehicles. The user in vehicle 102 may initiate the challenge by selecting any one of a plurality of different challenges. Since V2V communications are used in this example, the challenge is transmitted without use of the cloud or other non-V2V network, thus resulting in increased communication efficiency of the system. That is, the driver statistics system 103 of the vehicle 102 is arranged to directly communicate with the driver statistics system 103 of the vehicle 206. In other implementations, the vehicles communicate over the network 200. At block 604, system 100 identifies vehicles proximate to the first vehicle which are authorized to participate in the V2V challenge. System 100 may use geo-location methods and registration records to verify which vehicles and/or drivers, if any, are authorized to participate in challenges.

At block 606, system 100 transmits the selected V2V challenge from the first vehicle to an authorized second vehicle, wherein the V2V challenge is received by a second V2V challenge application positioned in the second vehicle. The V2V challenge is then presented to the user in the second vehicle. At block 608, in response to acceptance of the V2V challenge by the second vehicle, the challenge is initiated. At block 610, system 100 obtains statistical measure data of the first and second vehicles during the challenge using onboard sensors, the statistical measure data being relevant to the V2V challenge. For example, if the challenge is which vehicle can attain the best MPG between defined destinations, those sensors (e.g., fuel use sensors, miles travelled sensors, etc.) obtaining data relevant to MPG are activated. At block 612, based upon the obtained statistical measure data, system 100 determines the results of the V2V challenge. Here, for example, system 100 may compare the MPG measurements of both vehicles (or a group of vehicles) and rank them accordingly. Thereafter, system 100 then communicates the results to the participating users.

Although various embodiments and methods have been shown and described, the disclosure is not limited to such embodiments and methods and will be understood to include all modifications and variations as would be apparent to one skilled in the art. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. A computer-implemented method for vehicle-to-vehicle ("V2V") communication, comprising:

using input/output hardware communicably coupled to an electronic control unit of a first vehicle to initiate a first V2V challenge application to facilitate a V2V challenge between vehicles in proximity to one another, the first V2V challenge application being executed by the first vehicle, wherein the V2V challenge is an offer issued by the first vehicle to a second vehicle to compete based upon statistical measure data;

using the electronic control unit to identify a second vehicle proximate the first vehicle that includes a second V2V challenge application;

using network interface hardware in communication with the first V2V challenge application to wirelessly transmit the V2V challenge from the first vehicle to the second vehicle, wherein the V2V challenge is received by the second V2V challenge application on the second vehicle and communicated to an occupant of the second vehicle using input/output hardware of the second vehicle;

using sensors onboard the first and second vehicles to obtain statistical measure data of the first and the second vehicles during the V2V challenge, the statistical measure data being relevant to the V2V challenge;

based upon the statistical measure data, determining results of the V2V challenge using at least one of the first or second V2V challenge applications; and using the input/output hardware of the first and second vehicles to communicate the results to the first and the second vehicles, wherein the V2V challenge challenges occupants of the first and second vehicles based upon which vehicle can coast a longest distance using regenerative braking without applying braking mechanisms.

2. The computer-implemented method as defined in claim 1, wherein transmitting the V2V challenge comprises:
causing the first V2V challenge application to present a challenge menu to an occupant in the first vehicle; and
in response to a challenge menu selection, transmitting the V2V challenge.

3. The computer-implemented method as defined in claim 2, wherein the challenge menu is visually or audibly presented to the occupant.

4. The computer-implemented method as defined in claim 1, wherein when the second V2V application presents the V2V challenge to the occupant in the second vehicle, the occupant accepts the V2V challenge using the second V2V application, and upon acceptance of the V2V challenge by the occupant, the challenge is initiated.

5. The computer-implemented method as defined in claim 1, wherein determining results of the V2V challenge comprises comparing statistical measure data of the first and the second vehicles.

6. The computer-implemented method as defined in claim 1, wherein the V2V challenge also challenges an occupant of the second vehicle based upon which vehicle:
uses a least amount of fuel between points;
can get to a destination in a least amount of time;
can get to a destination in a fewest miles;
can get to a destination in a least amount of time using different routes; or
can accelerate to a defined speed the fastest.

7. The computer-implemented method as defined in claim 1, further comprising facilitating electronic messaging or audible communication between the first and the second vehicles, wherein such electronic messaging or audible communication may relate to recommended directions, routes, places of interest, or emergency locations.

8. The computer-implemented method as defined in claim 1, further comprising generating a record of the statistical measure data of the first and second vehicles.

9. A vehicle-to-vehicle ("V2V") communication system for a vehicle, comprising:
a V2V challenge application disposable on a first vehicle and configured to generate a challenge to compete with a second vehicle, wherein the challenge is an offer issued by the first vehicle to the second vehicle to compete based upon an operational parameter of the first vehicle;

an input/output hardware disposable on the first vehicle, the input/output hardware being in communication with the V2V challenge application and being configured to wirelessly communicate the challenge to a V2V challenge application of the second vehicle and being configured to communicate a competition result to an occupant in the second vehicle;

at least one sensor disposable on the first vehicle, the at least one sensor configured to obtain statistical measure data of the first vehicle that is relevant to the challenge, wherein based upon the statistical measure data, the V2V challenge application of the first or second vehicle determines results of the challenge; and a network interface hardware configured to wirelessly transmit the challenge to the second vehicle and receive data from the second vehicle relating to the challenge, wherein the V2V challenge application is configured to compare the received data from the second vehicle to the detected data of the first vehicle to determine which of the first and the second vehicles can coast a longest distance using regenerative braking without applying actual braking mechanisms.

10. The V2V communication system as defined in claim 9, wherein the V2V challenge application is also configured to compare the received data from the second vehicle to the detected data of the first vehicle to determine at least one of:
which of the first and the second vehicles uses a least amount of fuel between points;
which of the first and the second vehicles can get to a destination in a least amount of time;
which of the first and the second vehicles can get to a destination in a fewest miles;
which of the first and the second vehicles can get to a destination in a least amount of time using different routes; or
which of the first and the second vehicles can accelerate to a defined speed the fastest.

11. The V2V communication system as defined in claim 9, wherein the network interface hardware is configured to transmit the challenge directly to the second vehicle and receive data directly from the second vehicle.

12. The V2V communication system as defined in claim 9, wherein the V2V challenge application is configured to:
determine results of the challenge based upon the statistical measure data and the data received from the second vehicle; and
communicate the results of the challenge on the input/output hardware to the operator.

13. The V2V communication system as defined in claim 12, wherein the V2V challenge application is configured to rank the first and the second vehicles when it determines the results of the challenge.

14. The V2V communication system as defined in claim 12, wherein the V2V challenge application is configured to output the results to the network interface hardware for transmission to the second vehicle.

15. The V2V communication system as defined in claim 9, wherein the V2V challenge application is configured to display on the input/output hardware a selectable plurality of displayed challenges to be transmitted to the second vehicle, and configured to receive a selection from the input/output hardware selecting one of the selectable plurality of displayed challenges.

16. The V2V communication system as defined in claim 9, wherein the V2V challenge application is configured to communicate with a mobile phone of the vehicle occupant and present the selectable challenges on the mobile phone.

17. The V2V communication system as defined in claim 9, wherein the V2V challenge application is configured to obtain statistical measure data from the first and the second vehicle in real-time and communicate the results in real-time on the input/output hardware in real-time as the challenge is ongoing.

18. A non-transitory computer-readable medium having stored thereon machine-readable instructions executable to cause a machine to perform operations comprising:
   using input/output hardware communicably coupled to an electronic control unit of a first vehicle to initiate a first V2V challenge application to facilitate a V2V challenge between vehicles in proximity to one another, the first V2V challenge application being executed by the first vehicle, wherein the challenge is an offer issued by the first vehicle to a second vehicle to compete based upon statistical measure data;
   using the electronic control unit to identify vehicles proximate the first vehicle which are authorized to participate in the V2V challenge;
   using network interface hardware in communication with the first V2V challenge application to wirelessly transmit the V2V challenge from the first vehicle to an authorized second vehicle, wherein the V2V challenge is received by a second V2V challenge application being executed by the second vehicle and communicated to an occupant of the second vehicle using input/output hardware of the second vehicle;
   in response to acceptance of the V2V challenge by the second vehicle using the second V2V challenge application, initiating the challenge;
   using sensors onboard the first and second vehicles to obtain statistical measure data of the first and second vehicles during the challenge, the statistical measure data being relevant to the V2V challenge;
   based upon the statistical measure data, determining results of the V2V challenge using at least one of the first or second V2V challenge applications; and
   using the input/output hardware of the first and second vehicles to communicate the results to the first and second vehicles,
   wherein the statistical measure data relates to which vehicle can coast a longest distance using regenerative braking without applying braking mechanisms.

* * * * *